Dec. 17, 1963    R. C. KURTZ    3,114,391
COMBINED CHECK AND CHOKE VALVE DEVICE
Filed Feb. 23, 1961
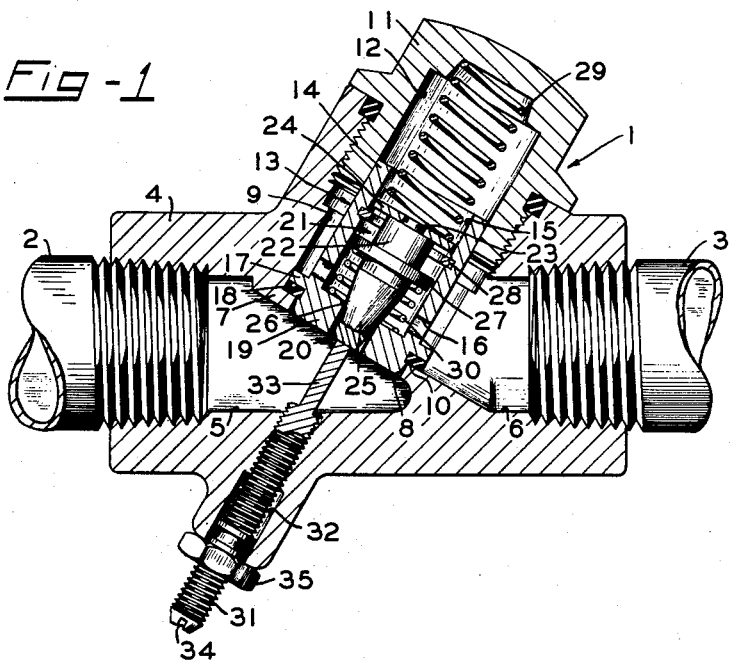
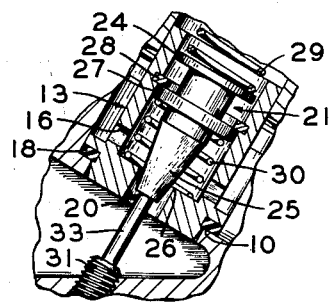
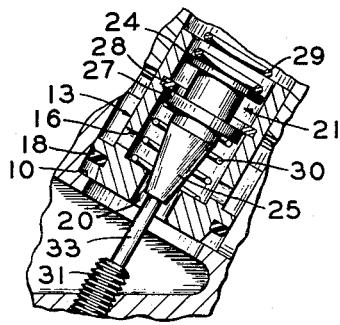
INVENTOR.
RONALD C. KURTZ
BY *Fred P. Kurtz*
ATTORNEY

United States Patent Office 3,114,391
Patented Dec. 17, 1963

3,114,391
COMBINED CHECK AND CHOKE VALVE DEVICE
Ronald C. Kurtz, Pittsburgh, Pa., assignor to Westinghouse Air Brake Company, Wilmerding, Pa., a corporation of Pennsylvania
Filed Feb. 23, 1961, Ser. No. 91,259
5 Claims. (Cl. 137—599.2)

This invention relates to combined check and choke valve devices providing free flow of fluid in one direction and a restricted flow of fluid in the reverse direction and, more particularly, to valves of this type which are adjustable to provide a wide range of restricted flow capacities.

It is an object of the present invention to provide an improved check and choke valve device of the above type characterized by a check and choke valve means so constructed and arranged that a single adjustment means engageable with only one of the valve means is operative to obtain a range of relatively small restricted flow capacities or a range of relatively larger restricted flow capacities.

In accordnace with the present invention this is accomplished by a combined check and choke valve device comprising generally a casing having an inlet port and an outlet port, a wall in said casing separating said ports and having an opening formed therein providing a valve seat, a hollow check valve means in said casing seatable on said casing valve seat upon flow of fluid through said ports in one direction and being unseated upon an unrestricted flow in the other direction, and including a restricted axial passageway having seat means formed therein, a choke valve means disposed within said hollow check valve means and having an end portion formed to meter the flow of fluid through said restricted axial passageway upon flow of fluid in said one direction, spring means biasing said choke valve so as to seat said metering end portion on said axial seat means and also seat said check valve on said casing valve seat during said flow in said one direction, a spring of lesser force than said spring biasing means arranged between said check and choke valve means opposing said spring biasing means, and adjusting screw means extending through said casing and engaging said metering end portion for unseating and selectively adjusting the positioning of said metering end portion relative to said axial seat means to an upper limit position thereby to meter a range of relatively small restricted flow capacities of fluid through said restricted orifice, and means on said check valve and choke valve means operative at the upper limit of said relatively small restricted flow capacities of fluid so that upon further adjustment of said adjustment means said check valve is unseated and selectively positioned relative to said casing valve seat thereby to meter larger restricted flow capacity of fluid through said casing valve seat and restricted axial passageway.

In the accompanying drawings:
FIG. 1 is a sectional view of the improved combined check and choke valve device adjusted to provide a relatively unrestricted flow of fluid in one direction only through the conduit;
FIG. 2 is a fragmentary view of FIG. 1 showing the needle valve component positioned to provide a selected flow in a reverse direction from that shown in FIG. 1 and within a small or low capacity restricted flow range; and
FIG. 3 is a fragmentary view of FIG. 1 showing the components positioned to provide a selected rate of flow in the same direction as shown in FIG. 2 but within a larger capacity restricted flow range.

Referring now to FIG. 1 of the drawings, the combined check and choke valve 1 embodying the invention is shown connected in a conduit in which fluid under pressure may flow in one or the reverse direction, the several sections of the conduit being identified by the reference numerals 2 and 3.

The valve device 1 comprises a casing 4 having an inlet port 5 and outlet port 6 connected to the pipe sections 2 and 3, respectively. The ports 5 and 6 are separated at their ends by a transverse diagonally extending wall 7 having a circular opening 8 providing a passage for the fluid under pressure through the device.

The casing 4 is formed with a bore 9 axially aligned with the fluid passageway 8 and of larger diameter than the latter so as to define a valve seat 10 on the wall 7. Threaded into the interior of the bore 9 is a cap screw 11 having an axially aligned bore 12.

Disposed in the casing bore 9 and the cap screw bore 12 is a check valve member 13 which is formed with a main body portion 14 having a bore 15. The check valve member 13 is sized so as to be slidably reciprocable within the cap screw bore 12 and is provided adjacent the inner end with a plurality of radial ports 16.

Formed on the check valve member is a flange 17 slidably reciprocable within the casing bore 9. Fixed to the underside of the flange 17 is a resiliently faced annular valve seat member 18 which is seatable on the valve seat 10. Positionable in the passageway 8 is a slightly tapered end portion 19 in which there is provided an axial restricted fluid passageway or orifice 20 communicating at one end with the port 5 and at the other end with the check valve bore 15.

Reciprocably mounted within the restricted passageway 20 is a choke valve device 21 having a body portion 22 of which the upper terminal end 23 is formed of reduced diameter and on which there is force fitted a guiding disc 24. The guiding disc 24 has an outer diameter sized to be fitted within the bore 15 so as to guide the choke valve 21 for axial movement. Formed on the other end of the choke valve device 21 is a metering end portion in the form of a tapering needle valve member 25 which is disposable within the restricted passageway 20 of the check valve device 13 and is seatable on the peripheral edge of the passageway 20 which defines a valve seat 26. Upon upward axial movement of the choke valve 21, the tapering needle valve member 25 is displaced away from the valve seat 26 so as to control or meter a restricted range of small flow capacity of fluid through the orifice 20. For limiting the upward movement of the choke valve device 21 away from the seat 26 and thereby the range of small flow capacity of fluid through the rstricted orifice 20 there is provided a flange 27 which contacts a snap ring 28 inserted in a groove in the check valve bore 15. Further upward movement of the check valve 21 when the flange 27 is in contact with the snap ring 28 results in lifting the check valve seat member 18 away from the seat 10 so as to provide a range of larger flow capacity of fluid from the port 6 to the port 5.

A compression spring 29 is housed within the bore 12 of the cap screw 11 between the top thereof and the choke valve disc 24 so as to hold the needle valve portion 25 firmly seated to close off the opening 20 and in this manner to also hold the check valve seat member 18 on the valve seat 10. The spring 29 is selected so that an unrestricted flow of fluid under pressure from the port 5 to port 6 is operative to unseat the check valve.

Disposed between the choke valve flange 27 and the lower end of the check valve bore 15 is a second compression spring 30 which opposes and is of a lesser value than the compression spring 30. The spring 30 serves to hold the check valve 13 seated when the choke valve 21 is moved upwardly against the force of the compression spring 29 to obtain a relatively small or low capacity flow of fluid through the orifice 20.

An adjusting screw 31 is sealingly screw-threaded into a partially threaded diagonal bore 32 opening into the bore 5 and extending through the casing wall at the opposite side of and in axial alignment with the bore 9. The inner end of the screw 31 is formed with a narrow stem 33 preferably of lesser cross-sectional diameter than the opening 20 to permit the entry thereof so as to raise the choke valve 21 away from its seat 26 against the force of the spring 29. Advantageously, the relationship of the diameter to the terminal end of the needle valve portion 25 permits the unimpeded flow of fluid through the opening 20 when the choke valve 21 is unseated.

Screw 31 has a slot 34 on its outer end to permit inward and outward adjustment thereof in the bore 32 and is further provided with a lock nut. As shown in FIG. 2, when the screw is turned inward a predetermined distance, the inner end of the stem 33 engages the terminal face of the needle valve member 25 and lifts the latter from its seat 26. In this position of the choke valve 21, fluid may be throttle past the needle member 25 and the seat 26 from the port 6 to port 5 via ports 16 and the orifice 20 to provide a small or low capacity restricted flow range.

When screw 31 is turned inwardly to a point where the choke valve flange 27 abuts the snap ring 28 in which position the needle valve member 25 is in full open position for low capacity flow, further movement upward causes the check valve device 13 to unseat as shown in FIG. 3. In this position, the flow of fluid may be throttled from port 6 to port 5 through the orifice 20 past fully opened needle valve member 25 and past the main check valve 13 through the opening 8. Hence, by progressive inward movement of the adjusting screw 31, a wide range of flow control and a sensitive adjustment of the rate of flow is obtained.

*Operation*

In operation assume that the improved check and choke valve device is interposed in a conduit, that the check valve member 13 and the choke valve device 21 are biased to hold the needle valve member 25 seated on the seat 26 of the check valve body 19 and thereby to also maintain the check valve seat member 18 seated on the valve seat 10. In this manner flow of fluid between the ports 6 and 5 is cut off while still permitting unrestricted flow of fluid from the port 5 to port 6.

Assume now that it is desired to control the flow of pressure of fluid in the reverse direction, i.e., from port 6 to port 5 at a selected restricted low capacity rate, the desired rate is obtained by turning the adjusting screw 31 inwardly of the casing. Inward movement of the screw 31 causes the stem 33 to contact the needle valve member 25 so that the latter is displaced from its valve seat 26, against the force of the spring 29. The spring 30 at the same time, because it is acting in opposition to the spring 29, holds the check valve member 13 seated on the seat 10.

The pitch of the screw 31 is preferably selected so as to permit a fine calibration of the movement of stem 34 and, accordingly, permit a fine calibration or metering of the flow area between the tapered surface of the needle valve member 26 and its seat 27. In this manner the choke valve device 25 may be selectively positioned relative to the orifice 20 between the zero flow position shown in FIG. 1 to the maximum low capacity flow position shown in FIG. 2 so as to obtain the desired metered low capacity flow rate from the port 6 to port 5 via the radial ports 16.

When the disc 27 abuts the snap ring 28 as shown in FIG. 2, further inward movement of screw 31 results in lifting the check valve seat member 18 from its seat 10 as shown in FIG. 3. The lifting of the check valve 13 is accomplished against the force of the spring 29; the spring 30 being operative to bias the check valve device 13 outwardly so as to maintain the maximum low flow capacity through the orifice 20. As mentioned above in connection with the adjustment of the rate of flow through the orifice 20, the pitch of adjustment screw 31 is operative to calibrate the flow area between the tapered surface of the needle valve member 25 and the orifice 20 so that further inward movement of the screw is also operative to calibrate and meter the flow area between the end of tapered portion 17 of the check valve and the opening 20. In this manner a higher capacity flow rate from the port 6 to the port 5 is obtained via the radial ports 16, the orifice 20 and through the selectively opened flow area past the check valve device 13 and the opening 8.

Having now described the invention, what I claim as new and desired to secure by Letters Patent, is:

1. A combined check and choke valve device comprising a casing having an inlet port and an outlet port, a wall in said casing separating said ports and having an opening formed therein providing a valve seat, a hollow check valve means in said casing seatable on said casing valve seat upon flow of fluid through said ports in one direction and being unseated to provide an unrestricted flow in the other direction and including a restricted axial passageway having axial seat means formed therein, a choke valve means disposed within said hollow check valve means and having an end portion formed to meter the flow of fluid through said restricted axial passageway, spring means biasing said choke valve so as to seat said metering end portion on said axial seat means and through said choke valve also seat said check valve on said casing valve seat, a spring of lesser force than said spring biasing means arranged between said check valve means and choke valve means to oppose said biasing spring, and adjusting screw means extending through said casing and engaging said metering end portion for unseating and selectively adjusting the positioning of the latter relative to said axial valve seat to an upper limit thereby to meter a range of relatively small restricted flow capacities of fluid through said restricted axial passageway, means within said check valve defining said upper limit and extending transversely of said check valve, and means on said choke valve means disposed remotely of said metering end portion for engaging said limit means so that upon further adjustment of said adjustment means after said engaging means engages said limit means said check valve is unseated and selectively positioned relative to said casing valve seat thereby to meter larger restricted flow capacity of fluid through said casing valve seat and said restricted passageway.

2. The invention as defined in claim 1 in which said engaging means comprises a flange and said spring opposing said biasing spring is disposed between said flange and the bottom wall of said check valve.

3. The invention as defined in claim 1 in which said adjusting screw means includes a stem engaging said end portion, said stem being of substantially uniform cross-sectional area along its length and of lesser diameter than said restricted axial passageway.

4. The invention as defined in claim 1 in which said limit means comprises a ring fixed within and disposed transversely of said check valve, and in which said engaging means comprises a flange.

5. A combined check and choke valve device comprising:
 (a) a casing having an inlet port and an outlet port,
 (b) a wall in said casing separating said ports and having an opening formed therein providing a valve seat,
 (c) a hollow check valve means in said casing seatable on said casing valve seat upon flow of fluid through said ports in one direction and being unseated to provide an unrestricted flow in the other direction and including a restricted axial passageway having axial seat means formed therein, (d) a choke valve means disposed within said hollow check valve means and having an end portion formed to meter the flow of fluid through said restricted axial passageway, (e) spring means biasing said choke valve so as to seat said metering end portion on said axial seat means and through said choke valve means also seat said check valve on said casing valve seat, (f) a spring of lesser force than said spring biasing means arranged between said check valve means and choke valve means to oppose said biasing spring, (g) adjusting screw means extending through said casing and engaging said metering end portion for unseating and selectively adjusting the positioning of the latter relative to said axial valve seat to an upper limit thereby to meter a range of relatively small restricted flow capacities of fluid through said restricted axial passageways, and (h) means effecting unseating of said check valve means in response to further extension of said adjusting screw means after said choke valve has reached said upper limit so that said check valve is unseated and selectively positioned relative to said casing valve seat thereby to meter larger restricted flow capacity of fluid through said casing valve seat and said restricted passageway.

References Cited in the file of this patent

UNITED STATES PATENTS

| | | |
|---|---|---|
| 896,468 | Schreidt | Aug. 18, 1908 |
| 2,333,455 | Warren | Nov. 2, 1943 |
| 2,365,892 | McLeod | Dec. 26, 1944 |
| 2,557,378 | Granberg | June 19, 1951 |
| 2,993,507 | Daly | July 25, 1961 |
| 3,032,063 | Wells | May 1, 1962 |

FOREIGN PATENTS

| | | |
|---|---|---|
| 537,952 | Italy | Jan. 12, 1956 |